Jan. 25, 1966   J. V. BOSSELL ETAL   3,231,110
KEG RACK WITH UNLOADING MEANS
Filed Aug. 28, 1964   4 Sheets-Sheet 1

James V. Bossell
Russell E. Bossell
INVENTORS

James V. Bossell
Russell E. Bossell
INVENTORS

Jan. 25, 1966        J. V. BOSSELL ETAL        3,231,110
KEG RACK WITH UNLOADING MEANS
Filed Aug. 28, 1964                4 Sheets-Sheet 3

James V. Bossell
Russell E. Bossell
INVENTORS

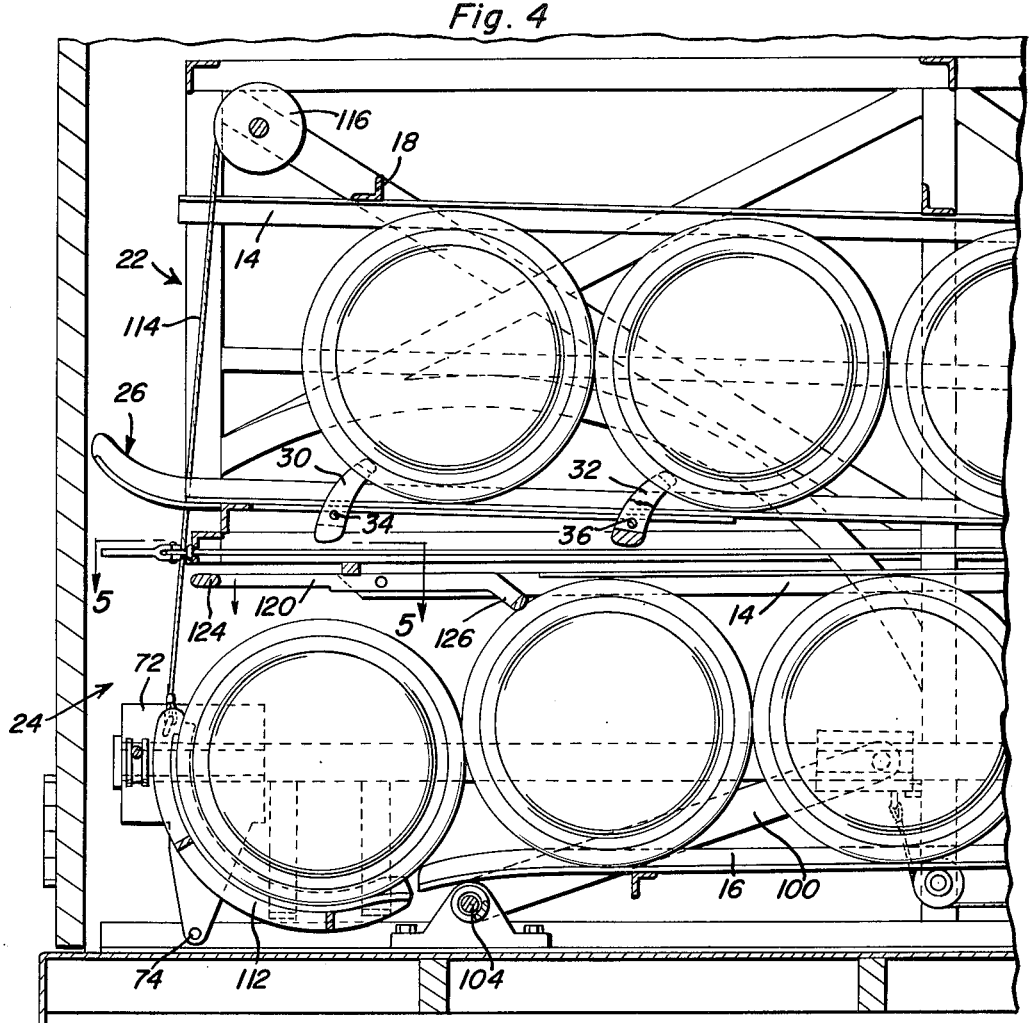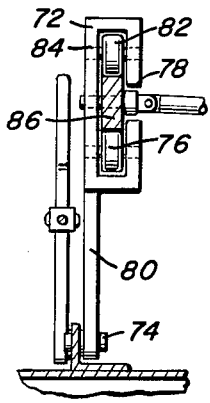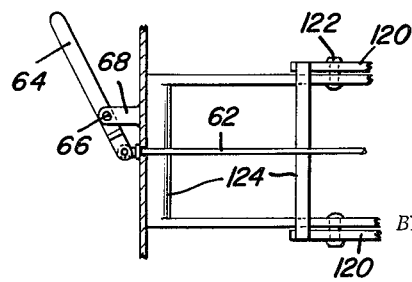

United States Patent Office 3,231,110
Patented Jan. 25, 1966

3,231,110
KEG RACK WITH UNLOADING MEANS
James V. Bossell and Russell E. Bossell, Shawano, Wis., assignors of fifty percent to Florence M. Bossell and fifty percent to Gertrude Bossell, both of Shawano, Wis.
Filed Aug. 28, 1964, Ser. No. 392,706
5 Claims. (Cl. 214—77)

This invention comprises a novel and useful keg rack with unloading means and more particularly pertains to a truck or other vehicle having therein a storage rack for the storing and gravity dispensing of cylindrical objects such as kegs.

The primary object of this invention is to provide a storage rack which will facilitate the compact storage transportation and the convenient loading and unloading of kegs and other cylindrical articles therefrom.

A further object of the invention is to provide an apparatus in accordance with the foregoing objects which will effect the movement of kegs and other cylindrical objects into and through the storage system and dispensing them therefrom solely by the influence of gravity.

A further object of the invention is to provide an apparatus for the compact storage of kegs, drums and the like in a plurality of different levels together with means for controlling and cushioning their movement from one level to another and their ultimate discharge from the lower end of the apparatus.

A still further object of the invention is to provide a device which will enable the discharge of kegs from the lowermost storage level to the ground or other destination by an adjustably positionable discharge ramp.

A still further object of the invention is to provide a keg storage system which will include means preventing the accidental movement of the kegs from the discharge ramp or from the inlet end of the storage means.

A still further purpose of the invention is to provide a readily extensible and retractable discharge ramp which may be compactly retracted into the construction of the apparatus when not in use and may be extended to provide an adjustable unloading ramp when its services are required.

A further purpose of the invention is to provide a device in accordance with the preceding objects wherein there is provided a controllable retarding action to effect a gentle lowering of the kegs from the storage rack of the apparatus at the discharge opening thereof.

Still another purpose of the invention is to provide an apparatus which shall include a retractable and extensible loading ramp or chute to facilitate the introduction of kegs, drums and the like into the uppermost portion of the rack system of the apparatus.

An additional object of the invention is to provide a device in accordance with the preceding objects wherein the retractable discharge ramp is maintained in retracted position thereby preventing the discharge of kegs and drums from the apparatus by an efficient latching mechanism.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a vertical longitudinal sectional view, parts being broken away, taken substantially upon the plane indicated by the section line 4—4 of FIGURE 3 and showing the loading and discharge ramps in their retracted positions;

FIGURE 5 is a horizontal sectional view taken substantially upon the plane indicated by the section line 5—5 of FIGURE 4 and of the unloading release mechanism;

FIGURE 6 is a detail view in vertical transverse section line 6—6 of FIGURE 1 and showing the retarding brake mechanism of the unloading portion of the apparatus; and, FIGURE 7 is a detail view in vertical longitudinal section of another latch and release means for controlling the descent of kegs from the upper level to the lower level of the apparatus.

Figure 1:
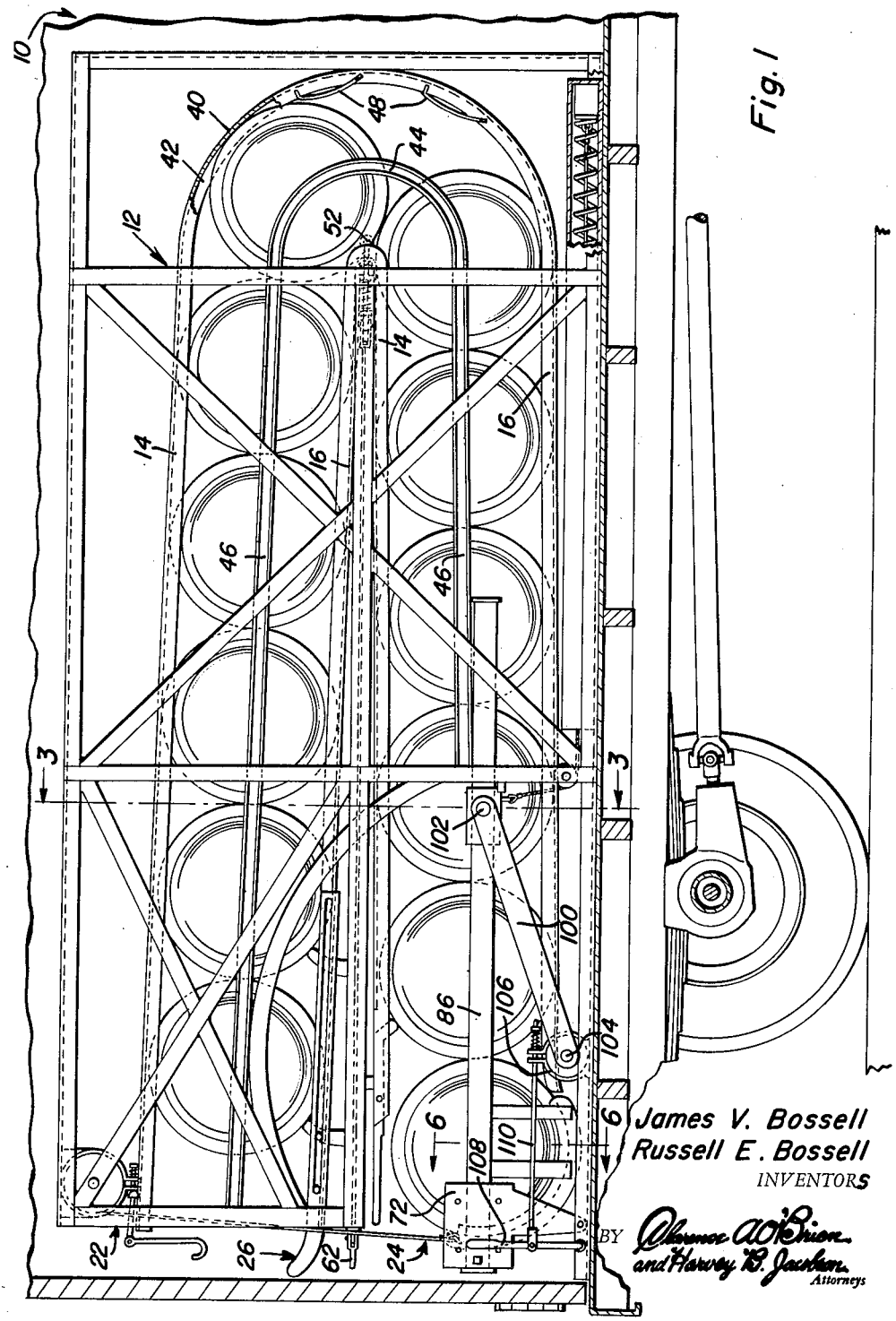
FIGURE 1 is a fragmentary view in vertical longitudinal section through a truck having the keg storage and unloading means of this invention applied thereto, parts being broken away, and with the device being shown in the stored and transporting position thereof.
Figure 2:
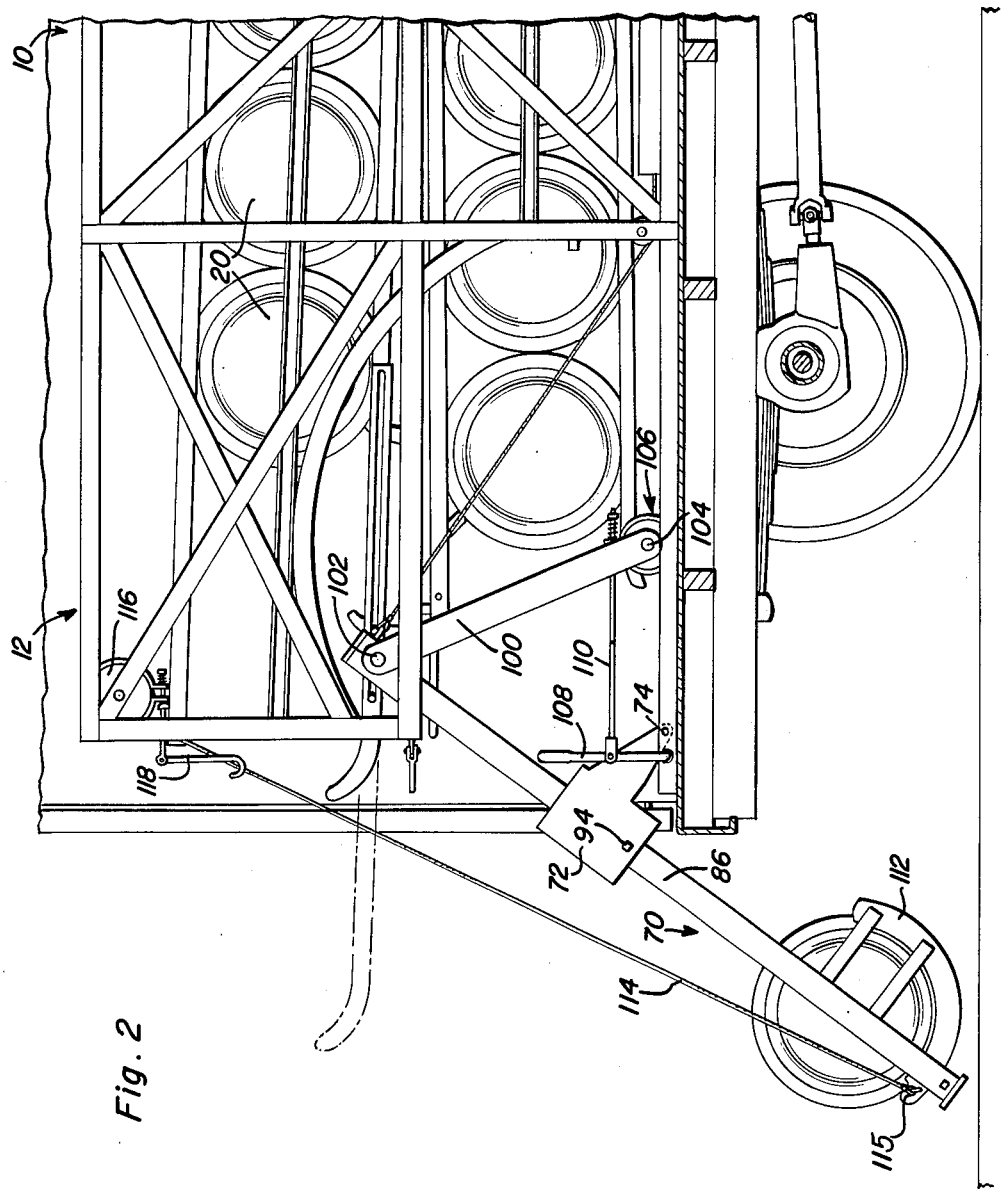
FIGURE 2 is a side elevational view of the rear or left hand portion of the apparatus of FIGURE 1 but in the unloading position thereof and showing the discharge ramp in its extended operative position.

Referring first to FIGURES 1 and 2, it will be seen that the numeral 10 designates generally a truck or other vehicle or enclosure in which the novel storage rack of this invention is installed. Although illustrated as being installed in a truck, whereby it is rendered mobile, the storage rack set forth and claimed hereafter is of general utility for the purpose of storing and dispensing kegs, cylinders, drums or other cylindrical objects which are capable of rolling about their central axes between an inlet station and a discharge station of the apparatus.

Figure 3:
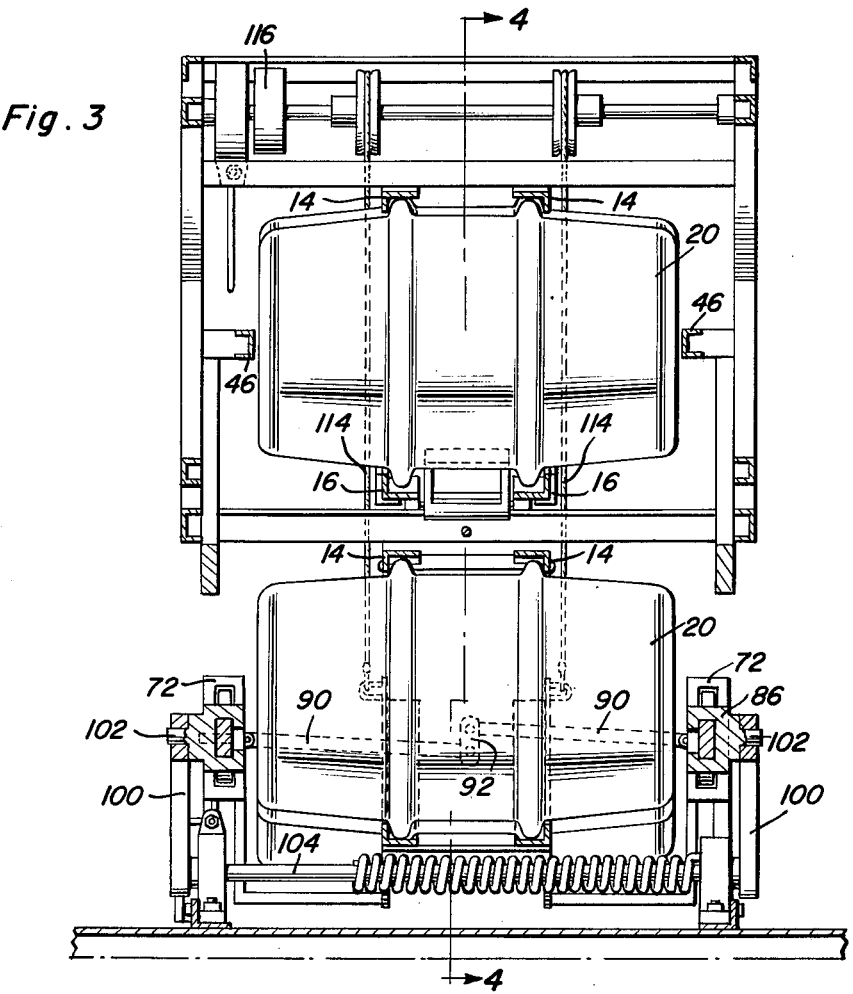
FIGURE 3 is a vertical transverse sectional view taken substantially upon the plane indicated by the section line 3—3 of FIGURE 1 and upon an enlarged scale and showing the upper and lower flights of the rack system of the invention.

The apparatus as illustrated in a suitable embodiment in the accompanying drawings includes a suitable supporting frame 12 which as shown may consist of longitudinally, horizontally and vertically extending beams together with cross bracing to provide a rigid rack-like assembly. In the embodiment illustrated, the assembly includes upper and lower flights of tracks preferably disposed in an inclined position. Thus, the upper and lower sections include pairs of upper and lower angle members 14 and 16, see FIGURE 3 and FIGURE 4, which are rigidly connected together as by transverse bracing members 18 and which are suitably supported by the framework 12. The track members 14 and 16 are so spaced that as shown in FIGURE 3, they will support and retain therebetween a keg, drum, barrel or other cylindrical object 20 so that the latter may roll about its central axis under the influence of gravity as it progresses from the inlet end or inlet opening or station indicated generally by the numeral 22 down the length of the upper and lower track sections until it reaches the exit or discharge end of the apparatus as indicated generally by the numeral 24.

To facilitate the loading of the rack by introducing kegs into the inlet end 22 thereof, there is provided an inlet or charging chute or ramp indicated generally by the numeral 26. The latter comprises a pair of track sections each slidably mounted upon and forming an extension of the lower rail 16 of the upper rack section whereby the inlet chute or track extension may be manually slid inwardly or outwardly between the full line position shown in FIGURE 2 which is the traveling or stored position of the device and the dotted line extended position shown therein which is the loading position. The extended sections provide a handy means for placing the kegs in proper position for their travel by gravity into the inlet opening 22 and from thence into the upper inlet end of the upper track section.

As shown best in FIGURE 4, there are provided non-return holding means for preventing the accidental discharge of kegs from the upper track section out of the inlet end 22 thereof. Thus, there are provided pivoted dogs 30 and 32 which are pivotally mounted as by pivot pins 34 and 36 respectively on a suitable portion of the framework of the rack assembly. The dogs are so placed that they will be gravity urged to the positions shown in FIGURE 4 which prevent retrogress movement of the kegs or drums, but will be pressed downwardly as a drum passes thereover to permit charging of the upper rack section with kegs.

It will be observed from FIGURES 1 and 4 that the upper and lower track sections of the rack assembly are reversely inclined. Thus, the upper section is inclined downwardly from its inlet opening 22 towards its far end, while the lower section is inclined upwardly from its outlet opening 24 to the far end. The adjacent far ends of the upper and lower sections are connected by a downwardly curving track section 40. This section includes an outer pair of track rails 42 which connect the adjacent ends of the upper rail 14 of the upper section with the lower rail 16 of the lower section. A similar inner rail 44 is provided in the connecting track section 40 which connects with side guide rails 46 of the upper and lower sections. Finally, the lower rail 16 of the upper section joins with the upper rail 14 of the lower section. The connecting section 40 thus provides a means which will permit a keg to move from the upper section downwardly through the connecting means and into the lower section.

In order to cushion such movement and prevent the strains and shocks of a sudden drop of the keg from an upper section to a lower section of the rack assembly, there are provided cushioning means in the form of leaf springs 48 disposed upon the connecting section rail 42 and which resiliently extend into the section a sufficient distance to frictionally and resiliently engage a keg as it moves through the connecting section thereby frictionally retarding its descent. It will be seen that during travel of the kegs through the rack, the lateral guide rails 46 engaging the ends of the kegs prevent them from shifting laterally off of their supporting rails 14 and 16.

Figure 7:
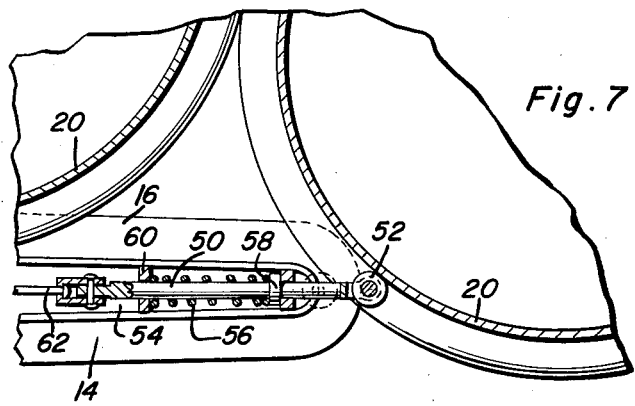

There is also provided in accordance with this invention a releasable latch means which normally prevents descent of a keg from the upper section through the connecting means to the lower section of the rack assembly but can be manually released to permit such movement of the kegs. This releasable latch means is shown more clearly in FIGURE 7 as consisting of a slidable rod-like member 50 having a frictional latch member 52 secured on its end, the member being slidably received and guided in a chamber 54 formed between the adjacent ends of the lower rail 16 of the upper section and the upper rail 14 of the lower section. A compression spring 56 engaging a collar 58 upon the member 50 and an abutment in the form of a bracket 60 suitably attached to the rails 16 and 14 yieldingly urges the member 50 to a position whereby it will engage and prevent movement of a keg 20 to the connecting section. In order to release this locking means or stop means, there is provided a manually operated cable 62, see FIGURE 5, which is connected to a manually operating lever 64 pivoted as at 66 to a suitable bracket or lug 68 upon the framework of the apparatus. The operation of the release latch will thus be readily apparent.

A very important feature of the invention consists in the discharge chute indicated generally by the numeral 70 and which controls the discharge of the kegs from the storage rack assembly. Referring now to FIGURES 1-4 and 6 in particular, it will be observed that the discharge ramp assembly 70 includes a pair of tiltable support brackets 72 which are pivotally mounted upon the frame of the apparatus as at 74. The brackets 72 include a body portion which is C-shaped in cross section as shown in FIGURE 6 providing a chamber 76 extending therethrough from end to end which chamber has a longitudinal slot 78 upon its inner wall. The body portion 72 is connected by the arm 80 in the previously mentioned pivot 74 to a suitable portion of the frame of the apparatus. Sets of upper and lower support and guide rollers 82 are journaled as by axles 84 within the upper housing portion and generally support therebetween for guided sliding movement a beam 86. It will thus be apparent the beam is mounted for both longitudinal sliding movement through the tiltable member 72 and for tilting movement therewith.

Latch means are provided for releasably retaining the tiltable support member 72 in its nontilted position shown in FIGURE 1. This latch means comprises, as shown in FIGURE 3 in particular, a pair of transversely extending latch rods each indicated by the numeral 90 and which are pivotally connected to opposite ends of a link 92. The ends of the latch rods 90 constitute latch pins which are selectively insertable into and removable from registrable apertures in the beam 86 and corresponding openings 94 in the side wall of the tiltable body 72. The arrangement is such that by any suitable means, including manual operation, the two latch rods may be moved towards each other or from each other by or with a resultant twisting of the connecting link 92, so as to simultaneously withdraw the latching pins at the ends of the latch bars from locking engagement in the tilting housing 72 and in the beams 86 or withdrawal therefrom thereby freeing the beams for sliding movement and the housings for tilting movement.

The discharge chute or ramp 70 further includes a connecting link 100 one end of which is pivotally connected as at 102 to the inner end of the beam 86, and whose other end is secured to a spring-biased shaft 104 constituting part of a friction brake drum assembly 106 of any conventional design. The shaft 104, as shown in FIGURE 3 has of course duplicate links 100 at its opposite ends which in turn are connected to duplicate beams 86 of duplicate tilting housings 72. A manually operated lever 108 is connected to a brake rod 110 which in turn is connected to the brake mechanism 106 to control the action of the latter and thereby apply any adjustable extent of braking action to the shaft 104 and thus control or stop the turning movement of the links 104 and thus through these links the sliding movement of the beams 86 in the housing 72. It will be understood that with this system locking movement of the links 100 in this manner will also positively lock the housings 72 in their tilted positions and correspondingly the sliding movement of the beams 86 therein thereby enabling the discharge ramp 70 to be locked in various adjusted positions of inclination.

Secured to the outer or lower ends of the beams 86 and extending transversely thereacross is a cage indicated generally by the numeral 112. This cage is so positioned that when a keg descends the discharge chute 70 it will be caught in the cage and retained until it is withdrawn for subsequent disposition. An additional control means is provided to assist the previously described adjusting means including the brake drum 106 and this additional means includes a cable 114 having its lower end secured to an eye 115 on the lower end of the beams 86 or of the cage 112 thereon. The upper end of this cable is secured to a spring-urged brake drum assembly 116 which may be similar to that previously described and which is manually controlled as by a control lever 118. Thus, either the lever 108 or the lever 118 may be utilized to apply a controlled braking action to the discharge ramp assembly 70 as the latter is tilted from its horizontal position in which a keg is rolled thereon, to its tilted position in which the keg descends by gravity to the discharge station consisting of the cage 112.

It will be appreciated that either of the brake control means 106 or 118 and their associated elements may be employed either as alternative control means or as supplemental control means.

A further stop means is provided for preventing discharge of more than one keg from the discharge opening 24 of the rack assembly onto the discharge ramp 70. This stop means, as shown best in FIGURES 4 and 5, comprises a frame consisting of a pair of levers 120 each of which is pivoted at 122 to a suitable portion of the frame structure of the device and which are provided with an operating handle 124 extending transversely across their outer ends for manual operation. At their inner ends, each lever is provided with an inturned finger 126 which is movable into the path of movement of the last keg on the lower rack section. The arrangement is such that the stop means will thus prevent discharge of kegs from the rack assembly onto the cage 112 of the discharge ramp 70 when the latter is in its raised position as shown in FIGURE 4. When it is desired to discharge a keg from the device, the stop means is released by engaging the handle 124 and pushing it downwardly thereby lifting the locking finger 126 for permitting the last keg to move under the influence of gravity from off the end of the rail section 16 and onto the cage 112. As soon as the keg moves from beneath the lifted fingers 126, the latter fingers drop by the influence of gravity into position to block the movement of the next keg, which moves along the rack to occupy the position of its predecessor under the influence of gravity.

The brake mechanisms either singly or collectively are operated by the levers 108 and/or 118 to release the locking action which prevents tilting of the loaded discharge ramp assembly. With the braking action released, the weight of the keg then effects a slow tilting of the housing 72 and in response to this tilting a sliding movement of the beams 86 therein until the lower end of the discharge ramp rests upon the ground.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for storing and dispensing kegs and other cylindrical objects comprising an elongated track inclining downwardly from an upper inlet to a lower outlet for the storage and travel of kegs thereon between said inlet and outlet, stop means associated with said track at said inlet admitting kegs through said inlet onto said track but preventing their return, a release latch associated with said track at said outlet blocking the discharge of kegs therefrom and operable manually to release kegs from said track to said outlet, means operable to controllably lower a keg from said track outlet to the ground, said apparatus including a vehicle body, said track being mounted in said body and including upper and lower track sections, the outer ends of said sections comprising said inlet and outlet respectively, said sections inclining downwardly and upwardly respectively from said outer ends to said inner ends, a connecting track section connecting said inner ends, resilient cushioning means in said connecting track section resiliently retarding passage of kegs from said upper track section to said lower track section, a latch member associated with said connecting section, spring means urging said latch member into a position preventing passage of kegs through said connection section, and manual operating means connected to said latch member and operable to withdraw said latch member from its keg blocking position in said connecting section.

2. The combination of claim 1 wherein said manual operating means includes a control member located at said outlet ends of said track sections.

3. A storage and dispensing rack for kegs and the like comprising an elongated track inclining downwardly from an upper inlet to a lower outlet and adapted for the storage and travel of kegs and the like thereon by gravity, a keg discharge ramp associated with said track outlet and receiving kegs moving by gravity from said track outlet, means mounting said ramp for pivoting movement between an idle position in which said ramp is raised into substantial alignment with said track at said outlet and an operative position in which said ramp is lowered into downwardly inclining relation to said track at said outlet, a pair of rocking members, each mounted for tilting about a horizontal axis disposed transversely of said track adjacent said outlet, guide means, said ramp being supported by and being slidably mounted in said guide means, ramp action regulating and controlling means connected to said ramp and effecting a controlled sliding movement of said ramp through said rocking members during tilting movement of the latter about said axis.

4. The combination of claim 3 wherein said ramp actuating means comprises a pair of connecting links each pivoted to said ramp and to a fixed pivot, means connected to said ramp and resiliently opposing sliding movement of said ramp through said rocking members and tilting of the latter.

5. The combination of claim 4 including a friction brake operatively connected to said ramp and adjustably opposing and controlling the rate of tilting movement of said rocking members about said axis.

References Cited by the Examiner

UNITED STATES PATENTS

| | | | |
|---|---|---|---|
| 1,088,980 | 3/1914 | Goble | 193—27 |
| 1,932,225 | 10/1933 | Minter | 193—32 |
| 2,146,533 | 2/1939 | Erickson | 214—84 |
| 2,244,524 | 6/1941 | Lima | 214—83.36 |
| 2,790,526 | 4/1957 | Donnelly | 193—27 |
| 3,042,231 | 7/1962 | Cyphert | 214—77 |
| 3,109,544 | 11/1963 | Learmont | 214—77 |

GERALD M. FORLENZA, *Primary Examiner.*